United States Patent
Karlsson et al.

(10) Patent No.: US 10,791,043 B2
(45) Date of Patent: Sep. 29, 2020

(54) WIRELESS COMMUNICATION SYSTEM AND METHOD FOR TRAINS AND OTHER VEHICLES USING TRACKSIDE BASE STATIONS

(71) Applicant: ICOMERA AB, Gothenburg (SE)

(72) Inventors: Mats Karlsson, Gothenburg (SE); Peter Eklund, Gothenburg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/417,715

(22) Filed: Jan. 27, 2017

(65) Prior Publication Data

US 2017/0222903 A1    Aug. 3, 2017

(30) Foreign Application Priority Data

Jan. 29, 2016    (SE) ...................................... 1650110

(51) Int. Cl.
*H04L 12/26*    (2006.01)
*H04L 1/18*    (2006.01)
(Continued)

(52) U.S. Cl.
CPC .......... *H04L 43/0864* (2013.01); *H04L 1/188* (2013.01); *H04L 1/1825* (2013.01);
(Continued)

(58) Field of Classification Search
None
See application file for complete search history.

(56) References Cited

U.S. PATENT DOCUMENTS

| 7,483,412 B2 | 1/2009 | Abhishek | |
| 8,681,753 B2 * | 3/2014 | Kokkinen | B61L 15/0027 370/328 |

(Continued)

FOREIGN PATENT DOCUMENTS

| EP | 1 175 757 | 1/2002 |
| JP | 2006-067507 A | 3/2006 |
| WO | WO 2015/169917 A1 | 11/2015 |

OTHER PUBLICATIONS

"ACK Timeouts and the effects on distance links". Internet article from http://www.air-stream.oig/ Created Jan. 15, 2016. Fetched May 5, 2017 from https://web.archive.org/web/20160105101017/http://www.air-stream.org/technical/ack-timeouts-and-effects-distance-links. (2 pages).

(Continued)

*Primary Examiner* — Gregory B Sefcheck
*Assistant Examiner* — Suk Jin Kang
(74) *Attorney, Agent, or Firm* — Buchanan Ingersoll & Rooney P.C.

(57) ABSTRACT

A method and device for wireless communication between a mobile router in a moving vehicle, such as a train, and an external wireless network is disclosed. The external network includes a plurality of base stations distributed along a vehicle path of travel in compliance with a WLAN standard. The method includes: setting a current value for a timeout parameter within the WLAN standard to a default maximum value exceeding a maximum propagation time between neighboring base stations along the vehicle path; determining when at least one mobile router is within the range of a first base station; determining a roundtrip time for communication between the first base station and the mobile router of the mobile router being most distant from the first base station; setting, in case this roundtrip time is significantly (Continued)

lower than the current value, a new current value in dependence on the roundtrip time.

15 Claims, 6 Drawing Sheets

(51) Int. Cl.
  *H04L 12/721*    (2013.01)
  *H04W 4/02*     (2018.01)
  *H04W 72/04*    (2009.01)
  *H04W 72/08*    (2009.01)
  *H04W 84/00*    (2009.01)
  *H04L 1/00*     (2006.01)
  *H04W 84/12*    (2009.01)

(52) U.S. Cl.
  CPC .......... *H04L 45/66* (2013.01); *H04W 4/023* (2013.01); *H04W 72/0446* (2013.01); *H04W 72/08* (2013.01); *H04L 2001/0093* (2013.01); *H04W 84/005* (2013.01); *H04W 84/12* (2013.01)

(56) References Cited

U.S. PATENT DOCUMENTS

| | | | |
|---|---|---|---|
| 8,705,527 B1* | 4/2014 | Addepalli | H04W 4/046 370/389 |
| 2004/0264366 A1* | 12/2004 | Swami | H04L 1/1635 370/229 |
| 2005/0286416 A1* | 12/2005 | Shimonishi | H04L 1/1671 370/229 |
| 2006/0133281 A1* | 6/2006 | Witherell | H04L 1/1854 370/238 |
| 2006/0171313 A1* | 8/2006 | Shimonishi | H04L 1/1874 370/229 |
| 2006/0203855 A1* | 9/2006 | Senta | H04L 1/1678 370/519 |
| 2008/0267141 A1 | 10/2008 | Ren et al. | |
| 2009/0073975 A1* | 3/2009 | Shimonishi | H04L 47/10 370/389 |
| 2009/0179772 A1* | 7/2009 | Yamamoto | B60R 25/2072 340/901 |
| 2009/0219900 A1* | 9/2009 | Kokkinen | B61L 15/0027 370/338 |
| 2010/0020689 A1* | 1/2010 | Tang | H04L 47/10 370/235 |
| 2010/0303054 A1 | 12/2010 | Yang et al. | |
| 2011/0194541 A1 | 8/2011 | Menaceur et al. | |
| 2011/0317998 A1* | 12/2011 | Fujimura | H04J 3/0682 398/25 |
| 2012/0188887 A1* | 7/2012 | Kobayashi | H04W 80/06 370/252 |
| 2013/0121190 A1* | 5/2013 | Lu | H04W 24/00 370/252 |
| 2013/0188562 A1* | 7/2013 | Espina Perez | H04L 1/188 370/328 |
| 2014/0215491 A1* | 7/2014 | Addepalli | H04W 4/046 719/313 |
| 2015/0215821 A1* | 7/2015 | Zhang | H04W 4/029 370/252 |
| 2016/0150451 A1* | 5/2016 | Barreto de Miranda Sargento et al. | H04W 36/14 370/332 |
| 2016/0381596 A1* | 12/2016 | Hu | H04B 7/0617 370/236 |
| 2017/0223592 A1* | 8/2017 | Karlsson | H04W 36/08 |

OTHER PUBLICATIONS

Office Action dated May 22, 2017, by the Swedish Patent and Registration Office in corresponding Swedish Patent Application No. 1650110-8. (9 pages).

The extended European Search Report dated May 30, 2017, by the European Patent Office in corresponding European Patent Application No. 17152878.9-1854. (14 pages).

Swedish Office Action dated Jul. 4, 2016, for International Application No. 1650110-8.

D. Valerio et al., "Optimization of IEEE 802.11 parameters for wide area coverage", dated Nov. 30, 2005, pp. 1-7.

* cited by examiner

WIRELESS COMMUNICATION SYSTEM AND METHOD FOR TRAINS AND OTHER VEHICLES USING TRACKSIDE BASE STATIONS

TECHNICAL FIELD OF THE INVENTION

The present invention relates to a wireless communication method and system for moving vehicles, such as trains, and in particular a method/system allowing more efficient communication between the moving vehicle and a stationary external communication network using a WLAN standard, and in particular using the IEEE 802.11 standard.

BACKGROUND

The demands on wireless communication capabilities in today's society are increasing rapidly. In particular, fast and easily accessible communication is desired through hand-held devices over large areas. It is particularly challenging to achieve such communication for mobile devices which are moving, e.g. when moving over large distances with poor network coverage or when affected by unknown sources of noise interrupting a signal for communication, such as clients moving on e.g. trains, airplanes, and other types of moving vehicles. In particular, if a client, such as a mobile phone, moves over large areas the client has to connect to several base stations in order to maintain a sufficient connection for communication.

Further, e.g. train carriages are made of metal, and even the windows are normally covered with a metal film. Accordingly, train carriages are shielded compartments, and direct communication between terminal antennas within the carriages and externally located antennas is difficult to obtain.

The mobile nature of a client with respect to the base stations may also introduce several potential sources of communication performance degradation. Such sources may derive from complex terrain, competition for available channels, or the source may be an unknown source of noise related to e.g. radio-frequency interference.

At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains and airplanes, and trains are in addition facing problems with poor line-of-sight between the base stations and the train. This puts a strain on the wireless network infrastructure, leading to poor performance.

To this end, moving vehicles, such as train carriages, are often provided with an external antenna connected to a repeater unit within the carriage, which in turn is connected to an internal antenna. Hence, the communication between the passengers' terminals and the operator antennas outside the vehicle occurs through the repeater unit. Similarly, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 and WO 15/169917 by the same applicant. This method has greatly improved the reliability of high-bandwidth wireless communication for trains and other large vehicles. However, this solution may still be insufficient to obtain an optimal transmission performance, especially for large data volumes. Trains and other moving vehicles often pass through areas with bad radio coverage, and present solutions are often unable to handle the required traffic.

Further, e.g. the current rising trend of streaming media uses far more data per minute of journey per passenger than older uses of the Internet, such as browsing text- and image-based sites like Facebook, or checking and responding to email.

Further, it is known to communicate with trains and other vehicles through dedicated devices arranged sequentially along the rail track, and with a certain distance apart. Such devices are generally referred to as trackside base stations or trackside access points. However, it has been found that communication via trackside base stations performs very poorly for many communication standards, such as for WLAN standards. For example, the 802.11 standard ("WiFi") cannot be used efficiently with trackside base stations, since the data throughput drops dramatically between the antennas, unless the antennas are very close to each other. However, arranging the trackside base stations that close to each other is not economically and practically feasible.

There is therefore a need for an improved method and system for communicating with clients on moving vehicles, and in particular trains, allowing increased capacity, capacity utilization, quality and/or cost-efficiency. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a method for wireless communication and a wireless communication system for moving vehicles, and in particular a train, which alleviates all or at least some of the above-discussed drawbacks of the presently known systems.

This object is achieved by means of a wireless communication method and system for a moving vehicle, such as a train as defined in the appended claims.

According to a first aspect of the present invention, there is provided a method for wireless communication between a mobile router in a moving vehicle, such as a train, and an external wireless network comprising a plurality of base stations, and preferably trackside base stations/access points, distributed along a vehicle path of travel, such as a train route, in compliance with a Wireless Local Area Network (WLAN) standard, the method comprising:

a) setting a current value for a timeout parameter within the WLAN standard to a default maximum value exceeding a maximum propagation time between neighboring access points along said vehicle path;

b) determining when at least one mobile router is within the range of a first access point;

c) determining a roundtrip time for communication between the first access point and the mobile router of said at least one mobile router being most distant from said first access point;

d) setting, in case said roundtrip time is significantly lower than said current value, a new current value in dependence on said roundtrip time, and preferably as a value between said roundtrip time and said previously used current value; and e) repeating at least steps b-d, and preferably steps a-d.

The "router" or "mobile router" is a networking router, which is a machine that forwards data packets between computer networks, on at least one data link in each direction. The router may be a mobile access router, and preferably a mobile access and applications router.

The "roundtrip time" generally correspond to the time it takes for the end of a data packet or frame to propagate from a sender to a receiver, and for a acknowledgment (ACK) packet or frame to propagate back to the sender. Since radio waves propagate at approximately 300 meters per µs, the roundtrip time is primarily dependent on the distance between the sender and the receiver.

By means of the present invention, the timeout of the WLAN standard, such as the 802.11 standard, may be controlled very efficiently, and it has surprisingly been found that by this control can be implemented very cost-efficiently. It can e.g. be realized solely or to a large extent in software and e.g. controlled on the MAC layer. Further, it has been found that this improved control renders it possible to communicate with WLAN between a moving vehicle and access points distributed along the vehicle path of travel, such as trackside base stations.

It is per se known that e.g. the default ACK timeout in 802.11 renders it difficult to communicate with access points being more than a certain distance away, such as being more than 2-300 meters away. This problem has e.g. been addressed in U.S. Pat. No. 7,483,412. However, the therein proposed solution is only suitable and useable for wireless devices that are stationary or rarely moved in relation to the access point. It is not suitable for fast moving vehicles, such as trains, with a constantly varying distance to the access points.

The default maximum value of the timeout parameter, and in particular when this parameter is ACK timeout, may e.g. be in the range 20-300 µs, and preferably in the range 50-200 µs, and most preferably in the range 75-123 µs, such as 100 µs.

The new solution provides multifold better performance than previously known WLAN solutions when used on trains and other vehicles. By means of the present invention, efficient WLAN communication is provided when the access points are provided more than 1 km apart along the vehicle path of travel (such as the train rail), and even when more than 5 km apart, and more than 10 km apart, and more than 20 km apart. Preferably, the access points are arranged with a separating distance in the range 1-20 km, and more preferably in the range 2-20 km, and most preferably in the range 5-20 km, such as 10-20 km.

A simple solution would at first glance be to set a very long timeout value. However, this would significantly lower the throughput and performance. Instead, the present invention allows the timeout, and preferably also the slot time, to be controlled dynamically, either continuously or periodically, thereby providing a suitable timeout value both at close ranges and long range, as well as in intermediate positions. Further, by initially setting a long timeout, and preferably also a long slot time, it is ensured that the timeout is always long enough, and every access point that becomes accessible from the vehicle will also, at first, be far away, and gradually come closer as the vehicle moves along the vehicle path.

In an experimental measurement an equivalent isotropic radiated power (EIRP) of 36 dBm was used to measure antenna downlink TCP throughput with 802.11 ac. At 1 km distance between the vehicle and the access point, a throughput of 500 Mbit/s was obtained, at 2 km, a throughput of 300 Mbit/s was obtained, at 3 km, a throughput of 250 Mbit/s was obtained, at 5 km, a throughput of 100 Mbit/s was obtained, and when the distance increased to 10 km, a throughput of 20 Mbit/s was obtained. Since the vehicle can communicate with access points both in the forward and the backward direction, this means that a minimum of 20 Mbit/s was obtainable when the access points were 20 km apart, and in case the vehicle communicates with both the forward and backward access points simultaneously (see below), 40 Mbit/s would be obtained when the distance to both access points is 10 km. As a comparison, previously known WLAN solutions have a throughput rapidly declining when the separation distance exceeds ½-1 km, and have severe problems communicating at all when the separation distance exceed 1.6 km. Thus, the present invention provides not only a possibility to communicate via WLAN at greater distances, but also dramatically improved throughput both at close, medium and long ranges.

In a preferred embodiment, the vehicle route/path is predetermined and the external wireless network comprising a plurality of base stations/access points, and preferably trackside base stations/access points, distributed along a vehicle path of travel, are located along the predetermined route. A spatial separation between at least one of the plurality of access points and the predetermined route (such as a train track) is optionally based on one or more of: the height of an antenna of the cell; a height of the vehicle; a maximum, minimum or average distance between the vehicle and the antenna; and the frequency of communication.

The system may comprise a plurality of masts, each mast having at least one antenna structure or construction mounted thereupon. Each antenna structure or construction may be coupled to a respective, separate access point for communication with the vehicle-based mobile router, although in some embodiments, multiple antenna structures or constructions on the same mast may be coupled to the same access point, or provide two or more access points. The access points may be connected to each other, to a network backhaul using e.g. an optical fibre system.

The masts may be spatially separated from one another, for example at regular intervals. They are typically located along a dedicated or predetermined route of the vehicle-based mobile router, such as a train track. This spatial separation may be selected on the basis of cellular radio network coverage. The distance between each mast and a dedicated route of the vehicle-based mobile terminal, such as a track may be based on one or more of: the height of the antenna on the mast; the height of the mast; the height of the vehicle; the topography of the terrain; the curviness of the track; the maximum, minimum or average distance between the vehicle and the mast (or a combination of these values); and the frequency of communication.

The timeout parameter is preferably an acknowledgment (ACK) timeout.

The WLAN standard for the communication is preferably the IEEE 802.11 standard (which may also be referred to as WiFi).

Step a) of the method may also include setting a current SlotTime to a default maximum value, and wherein step d) also includes setting the current SlotTime to a new, lower value, in dependence of the determined roundtrip time. Hereby, the performance is improved even further. Adjustment and re-setting of SlotTime is in particular advantageous for for collision avoidance when multiple routers are connected to the same access point. Further, in many WLAN standards, a station is only allowed to transmit at the beginning of the SlotTime, so this time preferably also adjusted when the vehicle and access point are far apart, for optimization of the performance.

By SlotTime is meant the basic unit of defining defined by the WLAN standard. This generally correspond to the time required to sense the end of a frame, start transmitting and for the beginning of the frame to propagate to the receiver. This may e.g. be equal to RxTx Turnaround Time+Channel Sensing Time+Propagation Delay+MAC processing time. The default value of SlotTime is generally set to a few microseconds. The default maximum value of the SlotTime as set in the method of the present invention may e.g. be in the range 20-200 µs, and preferably in the range 50-100 µs, and most preferably in the range 60-90 µs, such as 750 µs.

The step of repeating steps b-d, and preferably steps a-d, is preferably made periodically, at regular time intervals or after a certain waiting time after having completed the repetition. Hereby, the method allows the communication to operate with the newly set parameter value(s) for a certain time period, before performing a new repetition, and a new possible adjustment of the value(s). This improves the performance. The time intervals or the waiting time can preferably be set to a value within the range 0.1-100 seconds, and preferably in the range 0.2-10 seconds, and most preferably in the range 0.5-5 seconds, such as about 1 second.

Preferably the time parameters, such as ACK timeout and SlotTime, are set to be the same at both the mobile router and the access point for each communication session. Further, in case several mobile routers are having communication sessions with an access point simultaneously, the time parameters are preferably the same for all such mobile routers for the communication with this access point.

The method may be performed in either the vehicle or in the external mobile network. In case the method is executed in the external mobile network, the method may further comprise transmitting newly set current value(s) to the associated mobile router(s). Hereby, new adjusted values are determined for an access point by the exterior mobile network, and communicated to the one or several vehicles communicating with said access point. However, the method may also be operated independently in both the vehicle and in the external mobile network, so that each independently determines what time parameter settings to use.

The new current value may be set as the sum of said determined roundtrip time and a predetermined constant. Thus, the ACK timeout may e.g. be set as the roundtrip time+C, where C is a constant. C is preferably in the range 0.1-10 µs, and more preferably in the range 0.2-5 µs, and most preferably in the range 0.5-2 µs, such as about 1 µS.

The setting of values for the timeout parameter is preferably made at a Medium Access Control (MAC) layer of the OSI model.

The roundtrip time is preferably determined as determined by estimating the time elapsing between sending out a packet or frame and receiving a corresponding ACK packet or frame in response.

However, additionally or alternatively, the roundtrip time may be estimated based on an estimate of the distance between the mobile router and the first access point, based on GNSS (Global Navigation Satellite Systems), such as GPS, data for the vehicle. By providing a GNSS/GPS receiver on the vehicle, and by knowing the fixed positions of the access points, the distance between the vehicle and the closest access point(s) can easily be determined, and from this an estimated roundtrip time can be calculated.

The access points are preferably arranged so that there is at least some overlap between the coverage areas for neighboring access points. When a vehicle travels through this overlap area, a conventional handover may be performed from the previously passed access point to the access point ahead of the vehicle.

However, by means of the present invention, the coverage areas of the access points can be greatly extended, and consequently a relatively large overlap area can easily be provided between even much separated access points. In fact, due to the greatly extended coverage areas, the mobile routers will at most time have access to two access points—one ahead of the vehicle and one behind the vehicle. This can be used to enable simultaneous communication with more than one access point. Thus, the mobile router can preferably be arranged to simultaneously communicate with the external mobile network through at least two access points when more than one access point is accessible for the mobile router, thereby providing two concurrently useable data links. This enhances the communication performance significantly, and also alleviates the problems related to handovers.

Alternatively or additionally, the mobile router may be arranged to simultaneously communicate with at least one further external wireless network, thereby providing at least one further concurrently useable data link.

When several data links are available, the mobile router is preferably arranged to evaluate the quality of said data links, e.g. on a host layer and e.g. by repeatedly sending requests arranged to trigger a determinable automated response to said stationary communication server via said data links and measure the time until the triggered automated responses are received; and assigning data streams to said data links at least partly based on said evaluated quality.

Further, the mobile router in the moving vehicle may be arranged to receive and transmit wireless data packets to and from a stationary communication server outside the moving vehicle through the at least one exterior mobile network via at least one antenna, and to and from at least one client onboard the moving vehicle.

When the router is arranged to communicate with the communication server on at least two different data links (communication routes) having different characteristics, the router may be arranged to automatically separate the communication traffic between said data links based on an evaluation of the quality. The data streams may then be forwarded on one or several links to and from a dedicated external server, which may be referred to as an aggregation server or gateway. The different links thereby form a single virtual link between the router and the gateway.

The communication can be automatically optimized based on the evaluation, and also optionally on other conditions, such as price, speed, latency, etc. Thus, in addition to the evaluation, prioritizing and assignments may be made based on other static or dynamic parameters, such as signal strength and the like. Such further optimizations are per se known from EP 1 175 757 and WO 15/169917 by the same applicant, said documents hereby being incorporated by reference. An automatic selection is then made among the available data links to use the most efficient combination. Hence, a seamless distribution of the data among the different data links is obtained.

The router may, in addition to the trackside WLAN, use any available data links, such as GSM, Satellite, DVB-T, HSPA, EDGE, 1xRTT, EVDO, LTE, Wi-Fi (apart from the trackside WLAN) and WiMAX; and optionally combine them into one virtual network connection. In particular, it is preferred to use data links provided through wireless wide-area network (WWAN) communication technologies.

The selection of links is preferably made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

According to another aspect of the invention, there is provided a computer-readable storage medium encoded with instructions for executing in a wireless device the instructions, when executed, performing the above-discussed method.

With this aspect of the invention, similar advantages and preferred features are present as in the previously discussed first aspect of the invention.

According to still another aspect of the invention, there is provided a wireless device for wireless communication between a mobile router in a moving vehicle, such as a train, and an external wireless network comprising a plurality of base stations/access points, and preferably trackside base stations/access points, distributed along a vehicle path of travel, such as a train route, in compliance with a Wireless Local Area Network (WLAN) standard, the device including a processor arranged to perform the steps:

a) setting a current value for a timeout parameter within the WLAN standard to a default maximum value exceeding a maximum propagation time between neighboring access points along said vehicle path;

b) determining when at least one mobile router is within the range of a first access point;

c) determining a roundtrip time for communication between the first access point and the mobile router of said at least one mobile router being most distant from said first access point;

d) setting, in case said roundtrip time is significantly lower than said current value, a new current value in dependence on said roundtrip time, and preferably as a value between said roundtrip time and said previously used current value; and e) repeating at least steps b-d, and preferably steps a-d.

Also with this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to trains. However, it is to be acknowledged by the skilled reader that the method and system are correspondingly useable on other moving vehicles, such as buses, ferries, airplanes and the like.

Figure 1:
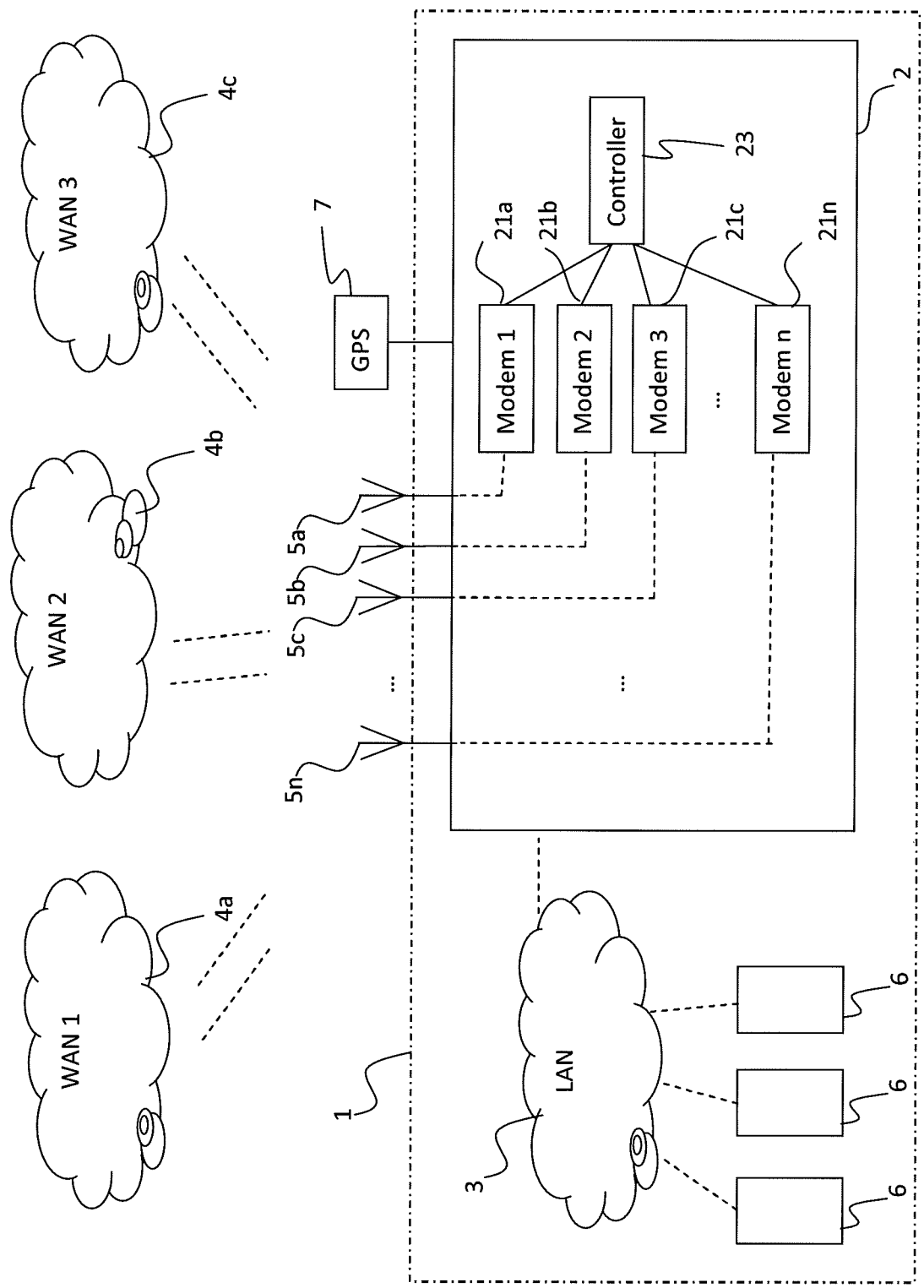
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c, including at least one external network having a plurality of access points, such as trackside access points, distributed along a vehicle path of travel, for communication in compliance with a Wireless Local Area Network (WLAN) standard, such as an 802.11 standard.

Communication to and from the WANs is provided through one or several antennas 5 a-n arranged on the train, the antennas may be arranged on the roof of the train, on window panes of the train, etc. Two or more data links are preferably available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs, tablets and so on.

The data communication router further preferably comprises a plurality of modems 21 a-n. Assignment of data streams to different WANs and/or to different data links on one WAN is controlled by a controller 23. The controller is preferably realized as a software controlled processor. However, the controller may alternatively be realized wholly or partly in hardware. The system may also comprise a GNSS receiver, such as a global positioning system (GPS) receiver 7 for receiving GPS signals indicative of the current position of the vehicle, and wherein the controller may be arranged to control in particular the performance of the communication with the trackside base stations in accordance with the vehicle position determined based on the GPS signals.

The data communication router may also be denominated MAR (Mobile Access Router) or MAAR (Mobile Access and Applications Router).

Figure 2:
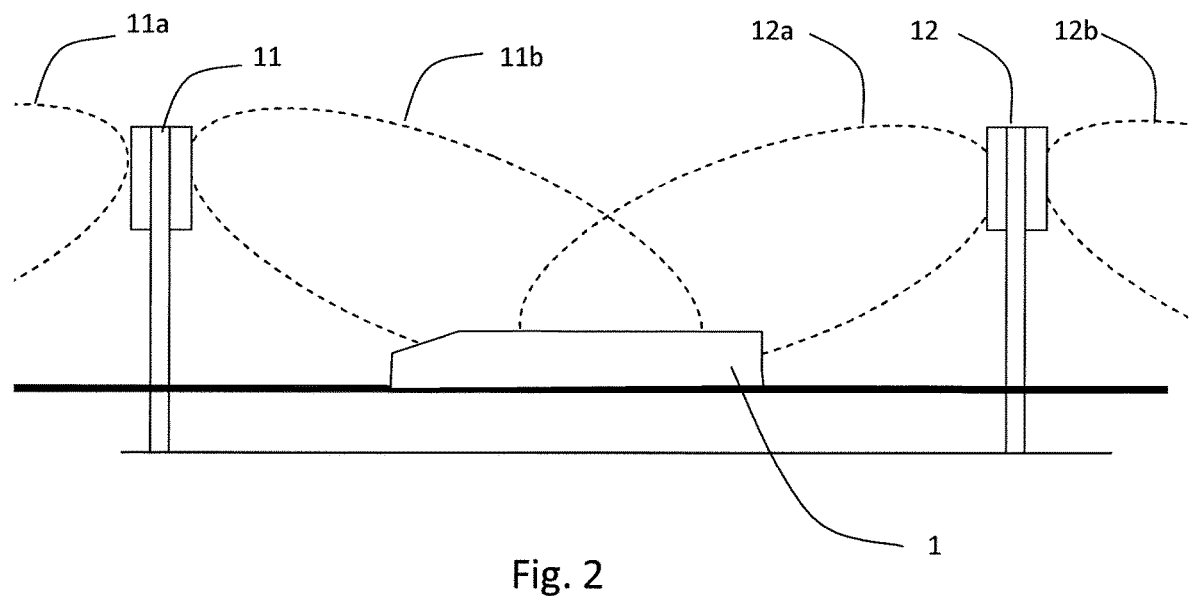
FIG. 2 is a schematic illustration of a train being associated with two access points of an external mobile network, in accordance with an embodiment of the present invention.

In FIG. 2, the external wide area network (WAN) including a plurality of access points, such as trackside base stations, distributed along a vehicle path of travel, i.e. the rail, for communication in compliance with a Wireless Local Area Network (WLAN) standard, such as an 802.11 standard, is illustrated in more detail. The external mobile network comprises a plurality of trackside base stations 11, 12, arranged along the vehicle path. The base stations have coverage areas 11a, 11b, 12a, 12b extending in both directions along the vehicle path. The coverage areas on the two sides of the base stations may be related to the same access point, or to different access points. Thus, coverage area 11a and 11b may be related to the same access point, or be operated independently, as different access point, and the same applies to coverage areas 12a and 12b, etc.

The coverage areas are preferably overlapping, allowing the mobile router of the vehicle to access several access points simultaneously, and thereby distribute the communication between several data links.

The mobile router may also be connected to other external networks, and may consequently simultaneously distribute the communication also over these networks.

Figure 3:
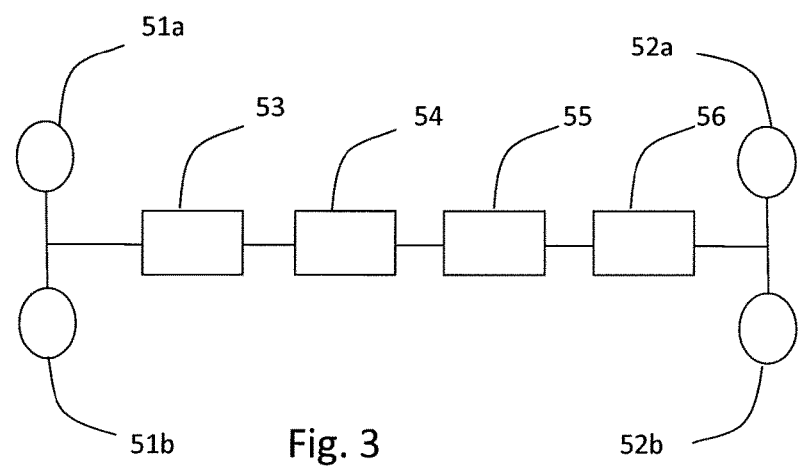
FIG. 3 is a schematic illustration of an antenna configuration to be used on trains in the systems of FIGS. 1 and 2.

Thus, the vehicle preferably comprises a plurality of antennas, for communicating with different links and different external networks. A schematic illustration of this is provided in FIG. 3. This antenna arrangement, for example arranged on the roof of the train, may comprise directional antennas 51a and 51b directed to access points in the backward direction of the train, directional antennas 52a and 52b directed to access points in the forward direction of the train, and additional antennas 53-56 arranged to communicate with base stations of other external networks, e.g. via GSM, Satellite, DVB-T, HSPA, EDGE, 1×RTT, EVDO, LTE, Wi-Fi (apart from the trackside WLAN) and WiMAX.

An exemplary embodiment for communicating with the trackside access points will now be described with reference to FIGS. 4A 4B 5A and 5B. In this method, a dynamic adjustment is made for certain timeout parameters in dependence of the distance between the vehicle and the access points. The method is preferably performed in the MAC layer of the 802.11 standard. By optimization performed both in the external mobile network and in the mobile router of the vehicle(s), a very efficient communication is obtained. The method is preferably executed in software.

In the following exemplary embodiment, the adjustments are determined by the external mobile network, and communicated to the mobile router(s) on the vehicles. However, as discussed in the foregoing, the adjustments may also be made in the mobile routers, or in both the external mobile network and the mobile routers, independently or in a synchronized fashion.

Figure 4A:
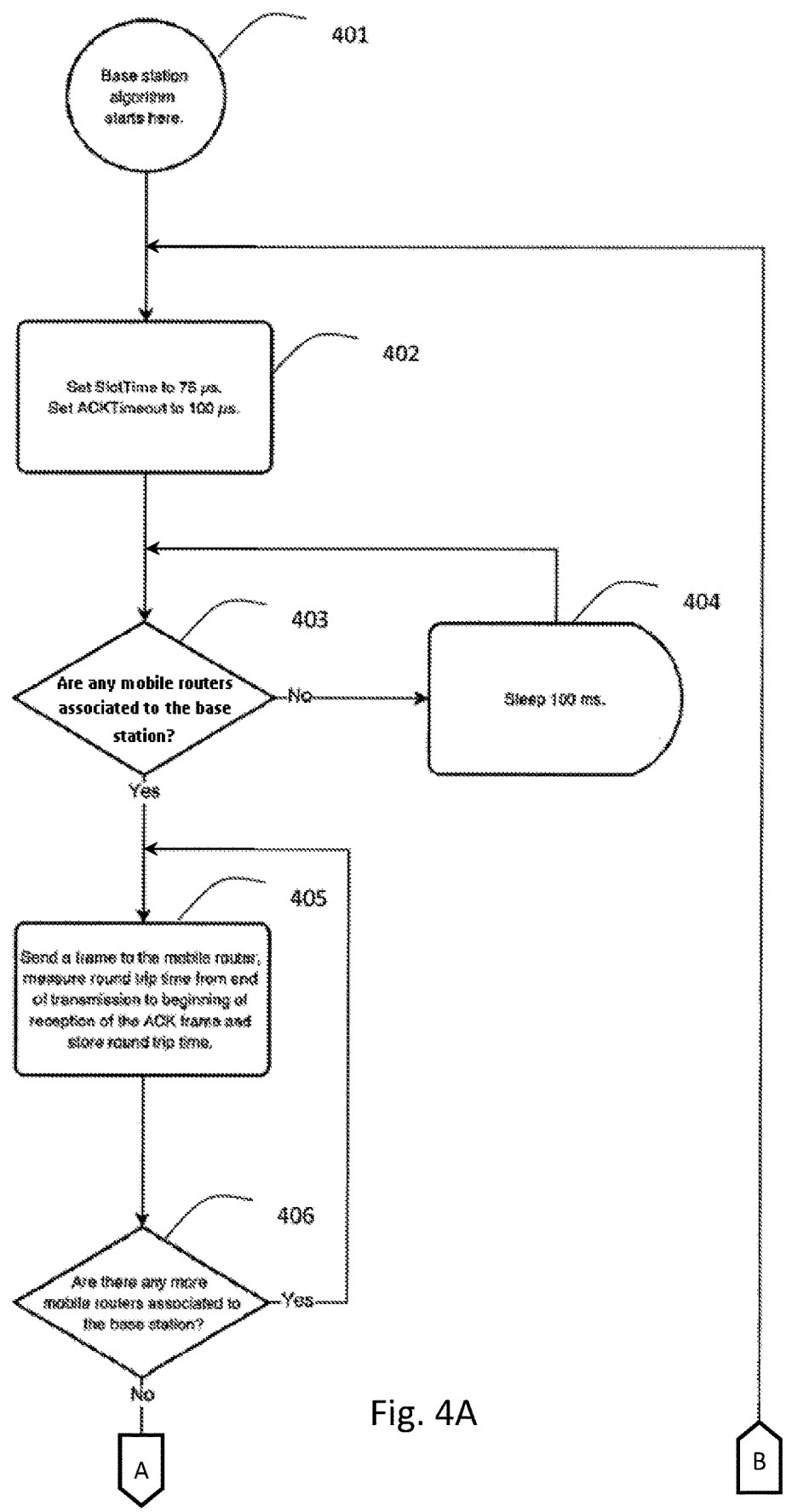
FIGS. 4A and 4B together form a schematic flow chart illustrating a process to be performed by the external mobile network, in accordance with an embodiment of the invention.
Figure 4B:
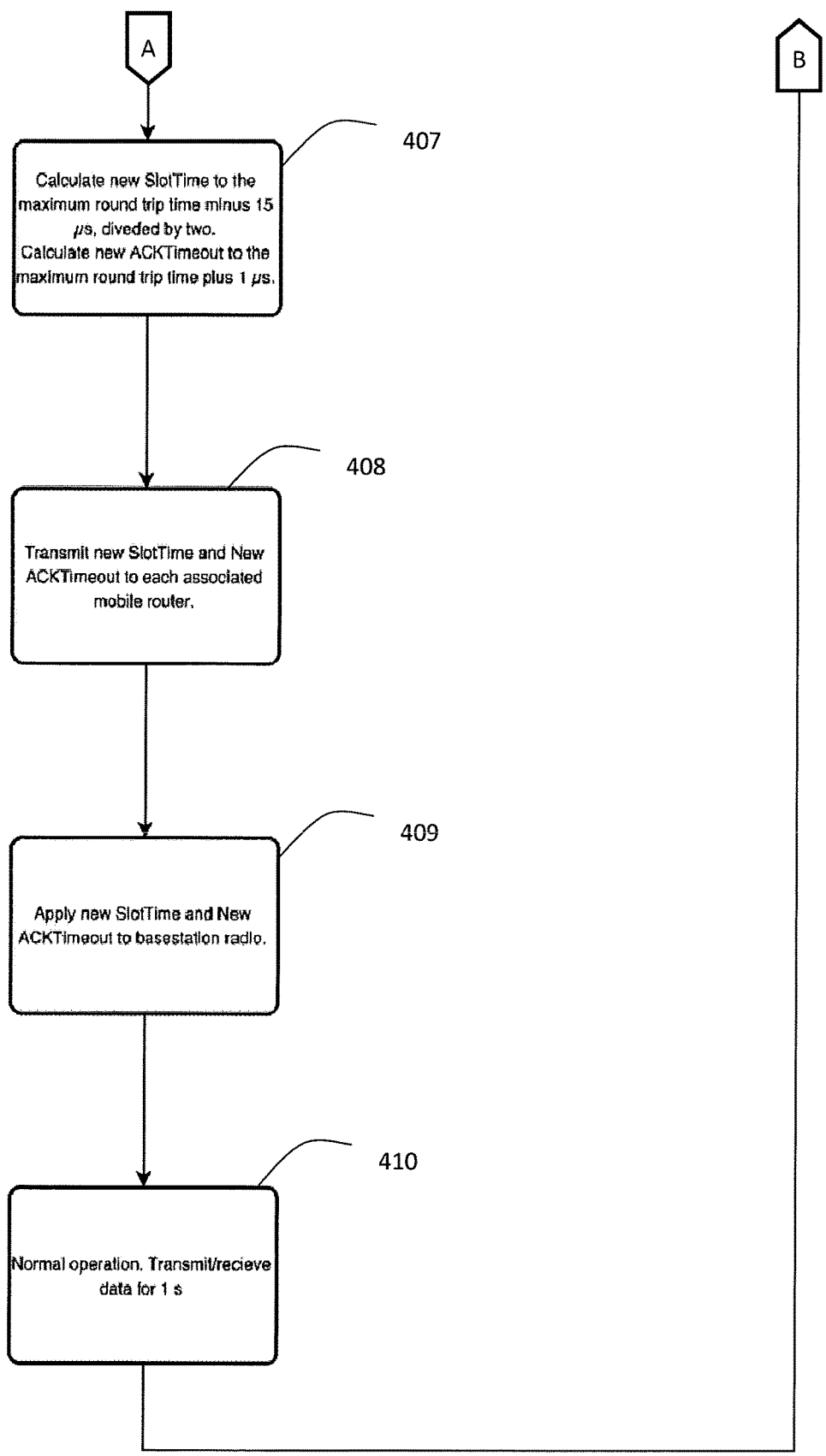

In FIGS. 4A and 4B, an operational method for an access point in the external mobile network is illustrated. The process starts in step 401. In a first step, 402, the ACK timeout and the SlotTime are set to maximum values. The maximum values are values set in accordance with the maximum roundtrip time between mobile routers and access points along the vehicle path. Thus, these values are set in accordance with the maximum air propagation time for the greatest possible distance to be covered. For example, the maximum ACK timeout may be set to 100 µs, and the SlotTime may be set to 75 µs.

In a following step, 403, it is determined whether any mobile routers are associated with the base station/access point, i.e. whether any vehicles are within the coverage area. If not, the process proceeds to a wait time, e.g. 100 ms, and is then repeated. This is repeated until a mobile router is detected. When one or several mobile router(s) is detected and associated with the base station, the process proceeds to step 405.

In step 405, roundtrip time is determined. This is done by sequentially sending a frame or packet to each mobile router. A timer is used to determine the roundtrip time from when the frame/packet is sent and until an ACK frame/packet is received from the mobile router. This timer has a timeout corresponding to the maximum ACK timeout set previously.

In step 406 it is determined whether any more mobile routers are currently associated with the access point, and if so, step 405 is repeated.

When the access point/base station has received ACKs from all associated mobile routers, new values for ACK timeout and SlotTime are determined, step 407. The new ACK timeout and SlotTime are determined based on the longest roundtrip time for the associated mobile routers. The new ACK timeout may then be determined to be the longest roundtrip time plus a constant, such as 1 µs. The new SlotTime may be determined to be the longest roundtrip reduced by a constant, such as 15 µs, and then divided by 2. Thus, the following applies:

$$SlotTime=(RoundTripTime-15\ \mu s)/2$$

$$ACKtimeout=RoundTripTime+1\ \mu s.$$

In a following step, 408, the new ACK timeout value and SlotTime value are communicated to the mobile router(s). When all the mobile routers have received the new settings, these are also set for the access point/base station, step 409.

The process then assumes a waiting period, e.g. for 1 second, during which the new settings are applied, with normal exchange of data in accordance with the WLAN standard (such as the 802.11 standard).

When the waiting period comes to an end, the process returns to step 402, and the process is repeated.

The mobile routers may be operated according to the same process as described above for the external mobile network. However, preferably the mobile routers are running a software program which ensures that the mobile routers are synchronized with the access point(s), so that the same parameter settings are used on both sides. An example of such a process will be discussed in the following.

Figure 5A:
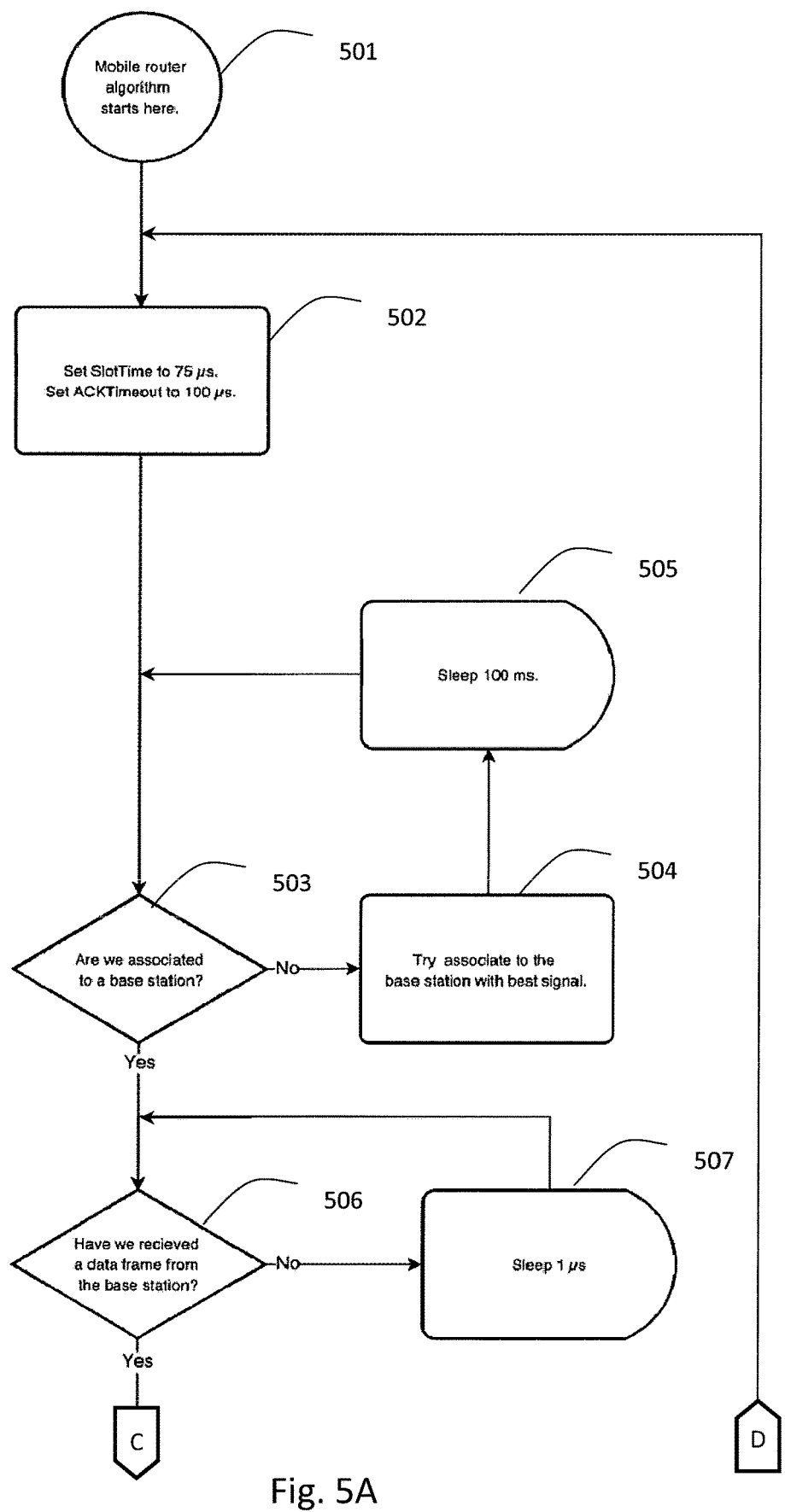
FIGS. 5A and 5B together form a schematic flow chart illustrating a process to be performed by the mobile router, in accordance with an embodiment of the invention.
Figure 5B:
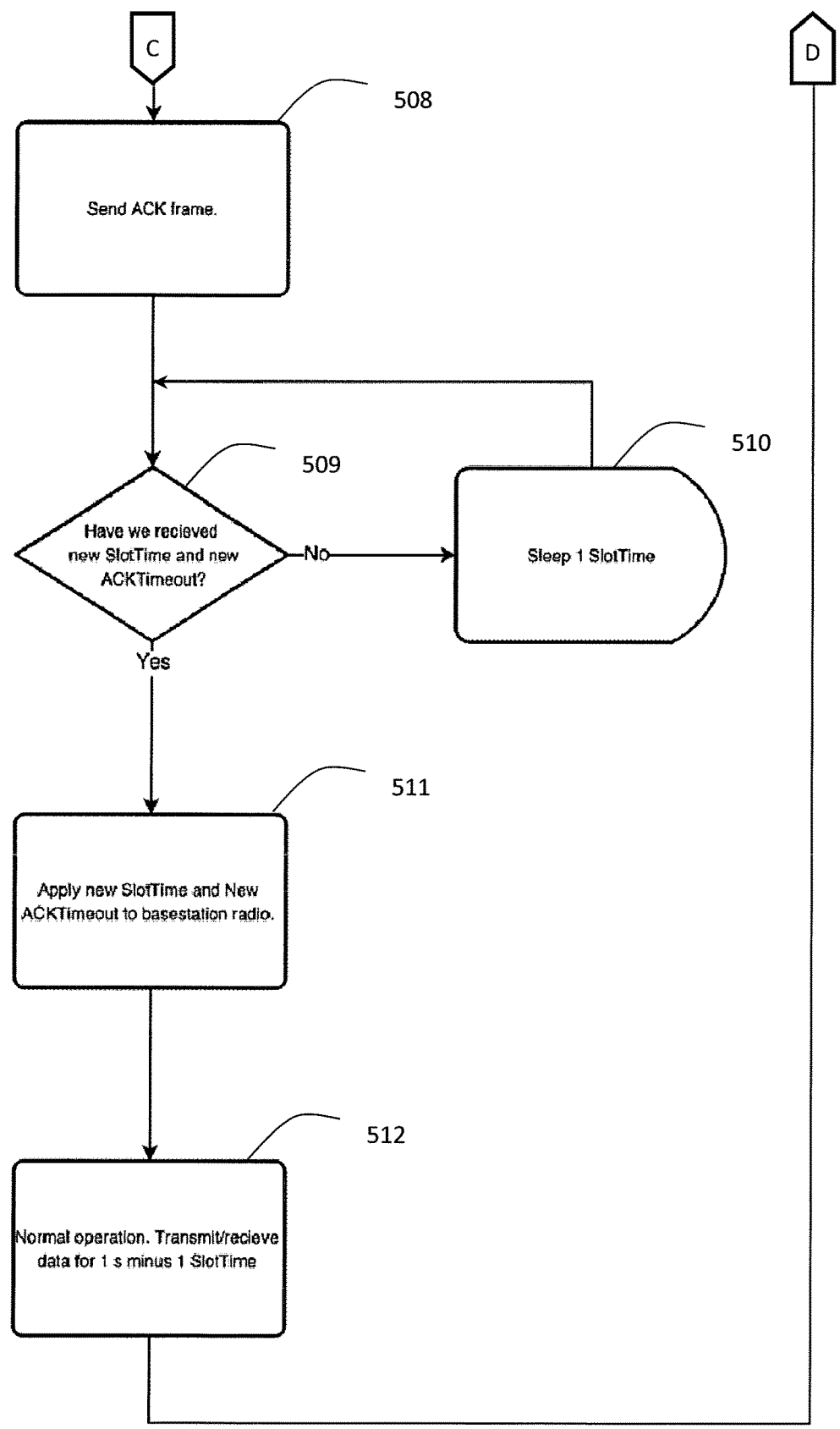

In FIGS. 5A and 5B, an operational method for a mobile router on a vehicle is illustrated. The process starts in step 501. In a first step, 502, the ACK timeout and the SlotTime are set to maximum values. The maximum values are values set in accordance with the maximum roundtrip time between mobile routers and access points along the vehicle path. Thus, these values are set in accordance with the maximum air propagation time for the greatest possible distance to be covered. For example, the maximum ACK timeout may be set to 100 µs, and the SlotTime may be set to 75 µs. The maximum ACK timeous and SlotTime are preferably set to identical values as used in the access points.

In a following step, 503, it is determined whether the mobile router is associated with a base station/access point, i.e. whether any access point is within the coverage area. If not, the process tries to establish contact with the access point/base station having the best signals, step 504. The process then proceeds to a wait time, e.g. 100 ms, step 505, and is then repeated from step 503. This is repeated until the mobile router is associated with an access point/base station.

When associated with an access point/base station, it is determined whether a data frame/packet has been received from the access point/base station, step 506. If not, the process proceeds with another waiting period, e.g. having a duration of 1 µS, step 507. This loop is repeated from step 506 until a data frame/packet has been received during the last iteration.

When a data frame/packet has been received, an ACK is sent in return, step 508.

It is then determined whether a new ACK timeout and SlotTime has been received from the access point/base station, step 509. If not, the process proceeds with another waiting period, e.g. having a duration of one SlotTime (which is at this step the maximum SlotTime of 75 µs), step 510. This loop is repeated from step 509 until new ACK timeout and SlotTime parameters have been received.

When new ACK timeout and SlotTime have been received, these new parameter settings are applied for the communication with this particular access point/base station, step 511.

The mobile routers then proceeds with normal communication with the access point/base station, sending and receiving data, for a time period controlled by a timer and having a corresponding duration as for the base station (1 s minus 1 SlotTime in this case), step 512.

After this period of normal operation using the new parameters and running the 802.11 protocol in conventional mode, the process is repeated from step 502.

As discussed in the foregoing, the mobile routers may be arranged to communicate with two or more trackside access points simultaneously. In this case, the same processes are run in parallel, one for each access point.

Further, the mobile router may also, simultaneously communicate with other accessible base stations through conventional protocols.

The two processes described above ensures that the parameter settings are optimized in correspondence with the distance during most of the time, thereby providing close to optimal throughput and minimizing the waiting times stipulated by the 802.11 MAC protocol between data frames. At the same time, the processes ensures that new mobile routers appearing in the outskirts of the access range of the access points are regularly detected, and are consequently taken into account.

The waiting times exemplified above may naturally be set differently for various applications and embodiments. Here, a tradeoff should preferably be made between the time spent sending useful data with close to optimal performance, and the time spent updating the parameters and searching for new mobile routers and access points. The settings are dependent on e.g. the distance between the trackside access points, the speed of the vehicle, etc. The exemplified processes has a granularity in the time domain of 1 µs, which corresponds to 300 m for one trip in the distance domain, or 150 m for return trips. The time duration for normal operation here exemplified as 1 second is very suitable for vehicles travelling at a speed of 150 m/s (540 km/h) or below, and is generally an adequate setting for most practical applications.

The invention has now been described with reference to specific embodiments. However, several variations of the communication system/method are feasible. For example, the present invention has here been disclosed in relation to trains, where it is considered to be particularly advantageous. However, it may also be implemented and used on other moving vehicles, and in particular vehicles intended for passenger traffic, such as buses, ferries, airplanes, etc. Further, the examples are mostly related to the 802.11 standard, but other WLAN protocols may also be used in the same or similar ways. Further, the settings used may differ between various applications.

Further, the above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method to be executed in a first base station for wireless communication between a mobile router in a moving vehicle and an external wireless network comprising a plurality of base stations distributed along a vehicle path of travel, in compliance with a Wireless Local Area Network (WLAN) standard, the method comprising:

a) setting a first value for a timeout parameter within the WLAN standard to a default maximum value exceeding a maximum propagation time between neighboring base stations of the plurality of base stations along said vehicle path;
b) determining when at least one mobile router is within the range of the first base station;
c) determining a roundtrip time for communication between the first base station and the mobile router of said at least one mobile router being most distant from said first base station;
d) setting, in case said roundtrip time is lower than said first value, a second value in dependence on said roundtrip time, said second value being set to the sum of said roundtrip time and a predetermined constant;
e) replacing said first value with said second value and using the second value for wireless communication; and
f) repeating steps a-e, wherein the step of repeating steps a-e is made periodically at certain time intervals or after a certain waiting time after the last repetition.

2. The method of claim 1, wherein the timeout parameter is an acknowledgment (ACK) timeout.

3. The method of claim 1, wherein the WLAN standard is IEEE 802.11.

4. The method of claim 1, wherein step a) also includes setting a current slottime to a default maximum value, and wherein step d) also includes setting the current slottime to a new, lower value, in dependence of the determined roundtrip time.

5. The method of claim 1, wherein the method is executed in said external mobile network, and wherein the method further comprises transmitting newly set current value(s) to the associated mobile router(s).

6. The method of claim 1, wherein setting of values for said timeout parameter is made at a Medium Access Control (MAC) layer.

7. The method of claim 1, wherein the roundtrip time is determined as the time elapsing between sending out a packet and receiving a corresponding ACK packet in response.

8. The method of claim 1, wherein the roundtrip time is further estimated based on an estimate of the distance between the mobile router and the first access point, based on GNSS data for the vehicle.

9. The method of claim 1, wherein the mobile router is arranged to simultaneously communicate with the external mobile network through at least two base stations when more than one base station is accessible for the mobile router, thereby providing two concurrently useable data links.

10. The method of claim 1, wherein the mobile router is further arranged to simultaneously communicate with at least one further external wireless network, thereby providing at least one further concurrently useable data link.

11. The method of claim 9, wherein the mobile router is arranged to evaluate the quality of said data links; and
    assigning data streams to said data links at least partly based on said evaluated quality.

12. A non-transitory computer-readable storage medium encoded with instructions for executing in a wireless device the instructions, when executed, performing a method as defined in claim 1.

13. A first access point of an external wireless network for wireless communication between at least one mobile router in a moving vehicle and an external wireless network comprising a plurality of access points distributed along a vehicle path of travel, in compliance with a Wireless Local Area Network (WLAN) standard, the first access point including a processor arranged to perform the steps:
    a) setting a first value for a timeout parameter within the WLAN standard to a default maximum value exceeding a maximum propagation time between neighboring access points of the plurality of access points along said vehicle path;
    b) determining when at least one mobile router is within the range of the first access point;
    c) determining a roundtrip time for communication between the first access point and the mobile router of said at least one mobile router being most distant from said first access point;
    d) setting, in case said roundtrip time is lower than said first value, a second value in dependence on said roundtrip time, said second value being set to the sum of said roundtrip time and a predetermined constant;
    e) replacing said first value with said second value and using the second value for wireless communication; and
    f) repeating steps a-e, wherein the step of repeating steps a-e is made periodically at certain time intervals or after a certain waiting time after the last repetition.

14. A method to be executed in a base station for wireless communication between a mobile router in a moving vehicle and an external wireless network comprising a plurality of base stations distributed along a vehicle path of travel in compliance with a Wireless Local Area Network (WLAN) standard, said standard being IEEE 802.11, the method comprising:
    a) setting a first value for a timeout parameter within the WLAN standard, said timeout parameter being an acknowledgment (ACK) timeout, to a default maximum value exceeding a maximum propagation time between neighboring base stations along said vehicle path;
    b) determining when at least one mobile router is within the range of the base station;
    c) determining a roundtrip time for communication between the base station and the mobile router of said at least one mobile router being most distant from said base station;
    d) setting, in case said roundtrip time is lower than said first value, a second value in dependence on said roundtrip time, said second value being set to the sum of said roundtrip time and a predetermined constant;
    e) replacing said first value with said second value and using the second value for wireless communication; and
    f) repeating steps a-e, wherein the step of repeating steps a-e is made periodically at certain time intervals or after a certain waiting time after the last repetition.

15. A first access point of an external wireless network for wireless communication between at least one mobile router in a moving vehicle and the external wireless network comprising a plurality of access points distributed along a vehicle path of travel in compliance with a Wireless Local Area Network (WLAN) standard, said standard being IEEE 802.11, the first access point including a processor arranged to perform the steps:
    a) setting a first value for a timeout parameter within the WLAN standard, said timeout parameter being an acknowledgment (ACK) timeout, to a default maximum value exceeding a maximum propagation time between neighboring access points along said vehicle path;

b) determining when at least one mobile router is within the range of the first access point;
c) determining a roundtrip time for communication between the first access point and that mobile router of said at least one mobile router being most distant from said first access point;
d) setting, in case said roundtrip time is lower than said first value, a second value in dependence on said roundtrip time, said second value being set to the sum of said roundtrip time and a predetermined constant;
e) replacing said first value with said second value and using the second value for wireless communication; and
f) repeating steps a-e, wherein the step of repeating steps a-e is made periodically at certain time intervals or after a certain waiting time after the last repetition.

* * * * *